Figure 1:
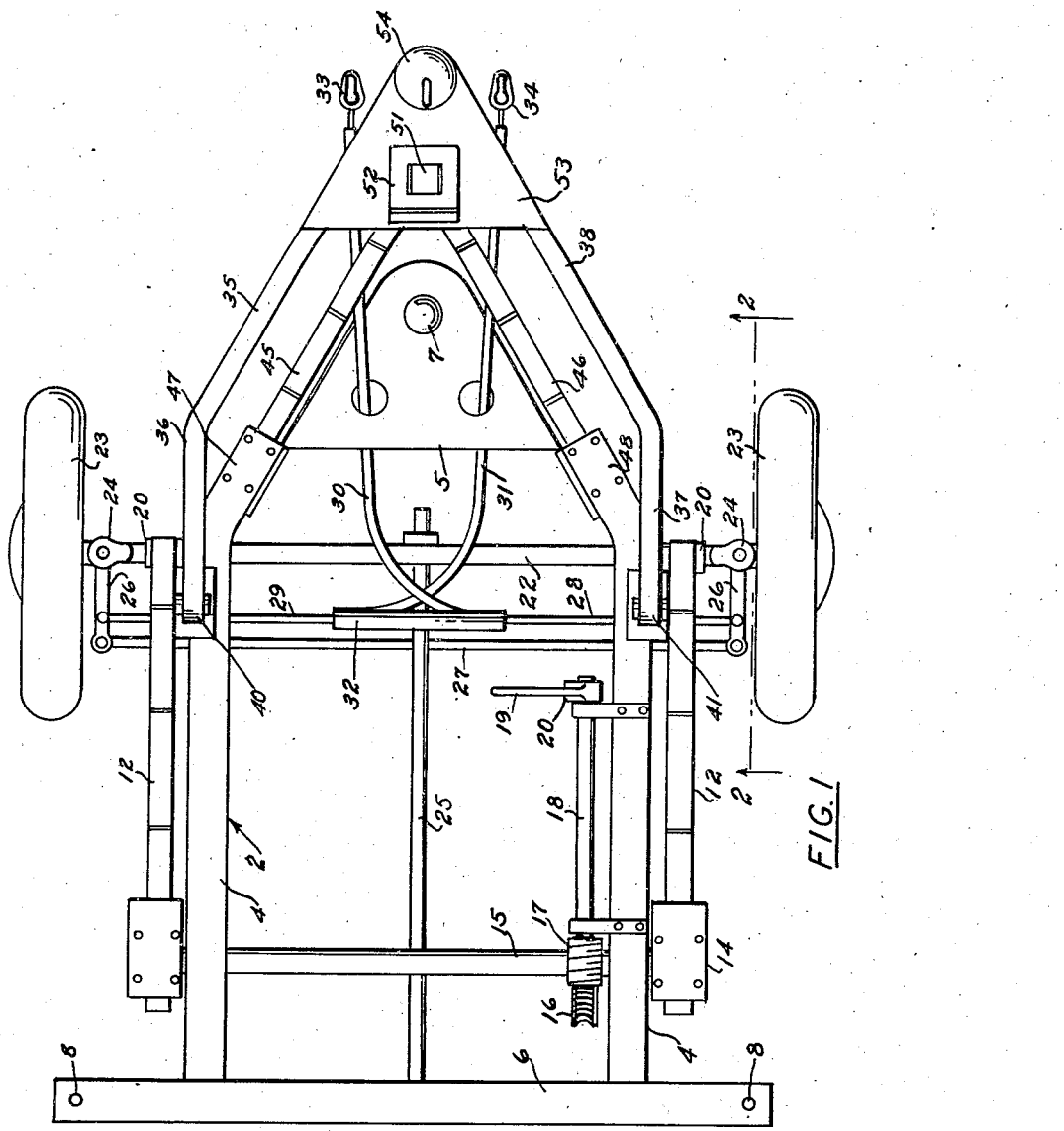

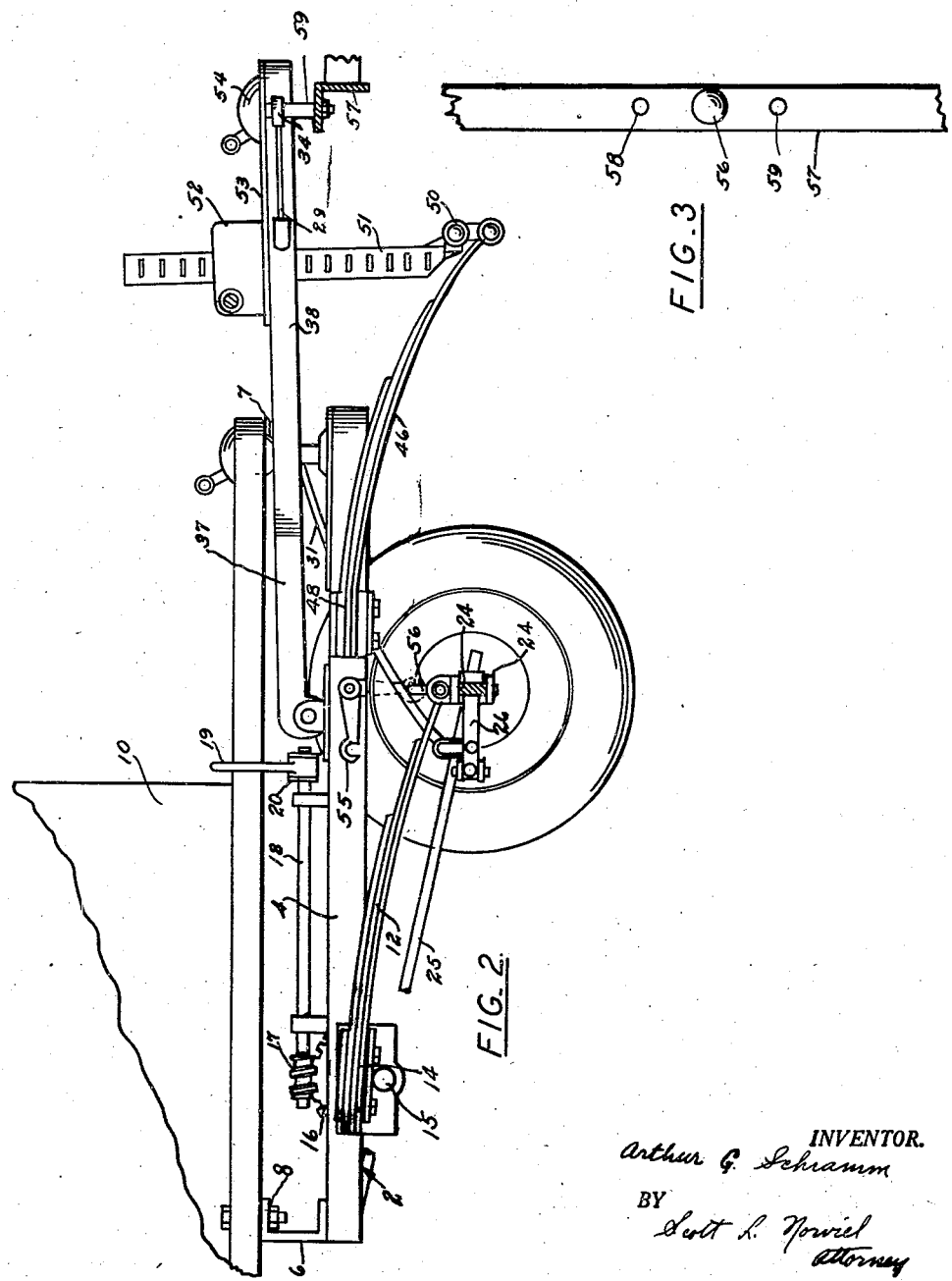

Patented Oct. 29, 1946

2,410,241

UNITED STATES PATENT OFFICE 2,410,241

RIDING DOLLY

Arthur G. Schramm, Phoenix, Ariz.

Application June 15, 1945, Serial No. 599,675

4 Claims. (Cl. 280—33.44)

This invention pertains to riding dollies for trailers of the type used to support the front end of two wheeled trailers while being towed.

It has for its objects the provision of a riding dolly having wheels which will support the weight of the front end of the trailer while being towed in the usual manner and will track so as to steer and follow the towing vehicle.

A second object is to provide a wheeled riding dolly which can be easily attached to the front end of a two-wheeled trailer so that it will support part of the weight ordinarily applied to the trailer hitch on the car and so that it will track after the towing car without side sway.

A third object is to provide a riding dolly, as above stated, having two parallel wheels sprung so as to relieve the hitch of the weight of the trailer and having mechanism adapted to vary the weight applied to the hitch as desired.

A fourth object is to provide a riding dolly, as stated, having means for raising either or both wheels from the ground, when necessary, while the trailer weight is distributed on the remaining supporting wheel and the hitch.

Other objects will appear hereinafter.

I attain the foregoing objects by means of the device and mechanism illustrated in the accompanying drawings, in which—

Figure 1 is a plan view of my improved riding dolly;

Figure 2, an elevation thereof with parts sectioned off along line 2—2, Figure 1, to better show construction; and Figure 3 is a plan view of a fragment of the traction vehicle draw-bar.

Similar numerals refer to similar parts in the several views.

This type of dolly is designed and intended to be attached to the front end of balanced two-wheeled trailers, or the like, using the hitch usually provided on the trailer as one of the attaching elements. When so attached, the dolly is hitched to the rear of the traction vehicle by the same type of hitch coupling as used on the trailer. The dolly having spring supported riding wheels then takes a portion of the load off the front end of the trailer and leaves the car free of this weight, as well as removing strains from the car body due to side sway and road shocks.

The dolly body frame 2 is made of channel steel to have a rectangular plan with a pointed V-shaped front end. Two lateral or side members 4 are joined by an A-shaped member 5 at the front, and by a transverse member 6, at the rear. A hitch ball 7 is positioned near the apex of the front A. The transverse member 6 is provided with holes 8 to take attaching bolts, or clamps to secure the rear end of the frame to the trailer body 10 (Fig. 2). Near the rear of this frame quarter leaf springs 12 are attached to each of said frame side members by clamps 14 at their butt ends, attached to a rotatable shaft 15 which extends transversely through the frame. This shaft has a part sector 16 keyed near the right end and turned by worm gear 17 on longitudinally extending shaft 18 which can be turned by lever 19 operating through ratchet 20.

The front ends of springs 12 are joined by clevises 20 to the end portions of an axle 22 which carries the riding wheels 23 on knuckle-steering joints 24. The axle is stabilized by the centrally positioned radius rod 25. The knuckles are each provided with rearwardly extending steering arms 26 joined by a tie-rod 27.

Steering movement of the wheels is accomplished by cables 28 and 29 attached to each steering arm and running through sheathing tubes 30 and 31 attached to a supporting block 32 welded to the radius rod slightly to the rear of the axle 22. Clasps 33 and 34 are attached to the forward ends of cables 28 and 29.

On top of frame 2 is a hitch frame 35 made of channel steel and having straight longitudinal side members 36 and 37 joined by a V front portion 38. The rear ends of these side members are fastened to the tops of side members of frame 2 by hinged fittings and joints 40 and 41 at a longitudinal position slightly to the rear of axle 22. The forward end of the hitch frame is, therefore, free to move upward and downward. This movement is controlled by quarter springs 45 and 46, having their butt ends clamped at 47 and 48 to the rear of the arm portions of the A of frame 2. These springs converge forwardly and are joined by a clevis fitting 50 to the bottom of the vertically adjustable jack column 51. This column is supported in a jack ratchet box 52 positioned on a supporting plate 53 in the front part of hitch frame 35. Near the apex of this frame is a ball hitch socket 54. Steering cables 28 and 29 cross each other and extend through the sides of the front portion of this frame.

Hooks 55 are pivoted on the sides 4 of frame 2 at positions just above axle 22 and are proportioned so that, when swung downward, they will engage eyes 56 on axle 20. When these parts are engaged, the end of the axle so engaged by each hook, respectively, is raised against the tension of its corresponding riding spring, so that the wheel on that end of the axle will clear the ground.

By raising jack column 51 in the hitch frame, tension upward against load carrying springs 45 and 46 can be increased. These parts are proportioned so that, if desired, sufficient tension can be applied through these springs to the front end of the frame 2 so that riding wheels 23 may be held clear of the ground when hooks 55 are engaged in axle eyes 56, as above stated. Under this condition the entire weight of the front end of the trailer is placed on the hitch 54. While this arrangement is seldom used, it can nevertheless be made in case of accidents to the riding wheel tires or for other similar reasons.

In operation, hitch socket 54 is attached to hitch ball 56 on the draw bar 57 of a traction vehicle, and steering cable clasps 33 and 34 are fastened in annular grooves in posts 58 and 59 on the bar 57 at each side of the ball 56.

As the traction vehicle turns the cables are drawn to effect steering and to cause the riding wheels to track those of the front vehicle.

The dolly riding wheels normally support most of the weight of the front end of the trailer. This weight is resiliently sustained by springs 12. Since the weight of the front ends of trailers varies substantially, the arrangement for varying the tension or lifting effort of these springs, including the pivotal mounts of shaft 15, is very important. It will be noticed that the springs normally extend forward and downward from their pivotal axes. Rotation clockwise, as viewed in Fig. 2, moves them further downward and increases the tension on the road. This means for varying their lift may take several different forms. For example, the springs as shown may be replaced by rigid members and the pivotal supporting shaft urged to turn clockwise by a resiliently applied torque furnished by springs, rubber cushions, or the like.

The salient principle is that the wheels are supported on a pivotally mounted downwardly and angularly extending element, which support is rotatively urged by a resiliently applied torque tending to move the wheel elements to a lower plane.

The hitch of trailers of the type here concerned is always subject to side sway, as well as up and down play due to road variations. All these movements rack the body of the traction vehicle whether it be a pleasure type automobile or heavy truck. The side sway also tends to skid the rear wheels of the traction vehicle, making driving more hazardous. The riding dolly, as here described, takes both the lateral side sway movements and the vertical strains. However, to take full advantage of the dolly a means of varying the amount of weight applied to the hitch is necessary. Some weight is usually desirable. But with ordinary two-wheeled, so-called balanced trailers this weight is excessive. Accordingly, the hinged hitch frame is used with the downward moment of force as applied on the hitch ball 56 made resilient and variable by the springs 46 and jack column 51. When these springs are relaxed by lowering this column, less weight is applied to the hitch and more remains on the dolly riding wheels 23. As tension is increased by raising this column more and more weight is applied to the hitch and less to the wheels, and they drop on their springs; that is, their weight keeps them on the ground unless they are raised by operation of lever 19 and shaft 15 or secured in raised position by hooks 55.

These hooks constitute a safety factor. In case a dolly tire goes flat and repairs are not immediately available, the wheel carrying that tire may be hooked in raised position against the tension of the spring on its side, while the other wheel may remain on the ground and operate to continue to support a portion of the trailer load. Obviously, both wheels can be raised clear of the road, if necessary.

Certain parts going into the construction have not been described or illustrated, in detail, for the reason that they are standard parts well known to the art. For example, the spring jack 52—51 is a ratchet jack ordinarily used to jack up the front ends of trailers and keep them level when the hitch is disconnected; hitch 54 is the ordinary ball and socket type provided with a latch fastener; radius rod 25 is attached to a rear transverse frame member by a rubber mounted ball and socket joint; and 20 is a two-way click ratchet standard with various wrench tools.

Having now fully described my invention and explained its use, I realize that there may be many variations in structure and substitutions of parts. Therefore, I wish to be limited only by the following claims.

I claim:

1. A riding dolly for trailers comprising a dolly frame, a pair of wheels supporting said frame, forwardly and downwardly extending quarter springs, mounted on said frame at their rear and to said wheels at their front, mounts for said springs on said frame adapted to rotate whereby the downward angle of said springs relative to said frame is increased, a hitch frame hinged to and extending forwardly above said dolly frame having a hitch socket at its front end, resilient adjustable means for maintaining said hitch frame downward relative to said dolly frame.

2. A riding dolly for trailers, comprising in combination, a dolly frame having means for attachment to the forward end of a trailer; riding springs extending forwardly and downward from the rear portion of said dolly frame, spring attachment mounts adapted to be rotatively supported on said dolly frame, a transverse axle attached to the outer ends of said springs, riding wheels supported on steering knuckles on said axle, means for rotating said spring attachment mounts whereby the downward angle of said springs can be varied relative to the plane of said dolly frame; means for steering movement of said wheels on said knuckles including cables attached thereto, extending forward and adapted for attachment to and actuation by the traction vehicle; a hitch frame hinged to the top of said dolly frame and extending forwardly therefrom having a hitch socket at its front end, leaf springs extending forwardly and downwardly from said dolly frame having a shackle at their forward ends, a jack column extending vertically through said hitch frame attached to said shackle at its lower end and having means for vertical adjustment in said hitch frame.

3. A riding dolly for trailers, including, in combination, a dolly frame having lateral members and means for attaching the forward end of a trailer thereto, sprung riding wheels, and a transverse axle attached thereto having means for steering and for varying their vertical position relative to said dolly frame, a hitch frame hinged at its rear end to said dolly frame and extending forward and upward when in operative position and having means of attachment to a traction vehicle at its forward end; means for shifting the trailer load from said riding wheels to said hitch frame including springs operative intermediate said dolly frame and said hitch frame positioned to resiliently force the forward end of said hitch frame downward, and mechanism for increasing the tension of said springs whereby downward force is increased on the fore end of said hitch and the dolly frame is correspondingly lifted.

4. In the device defined in claim 3, mechanism for raising the said riding wheels from riding position including hooks pivoted on said lateral frame members operative to engage eyes on said wheel axle whereby either of said wheels may be maintained at a predetermined elevated position relative to normal road position.

ARTHUR G. SCHRAMM.